United States Patent
Choi et al.

(10) Patent No.: US 10,027,971 B2
(45) Date of Patent: *Jul. 17, 2018

(54) COMPRESSED BLANKING PERIOD TRANSFER OVER A MULTIMEDIA LINK

(71) Applicant: Lattice Semiconductor Corporation, Portland, OR (US)

(72) Inventors: Hoon Choi, Mountain View, CA (US); Ju Hwan Yi, Sunnyvale, CA (US)

(73) Assignee: Lattice Semiconductor Corporation, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/730,684

(22) Filed: Oct. 11, 2017

(65) Prior Publication Data

US 2018/0035122 A1    Feb. 1, 2018

Related U.S. Application Data

(63) Continuation of application No. 14/470,620, filed on Aug. 27, 2014, now Pat. No. 9,800,886.

(Continued)

(51) Int. Cl.
*H04N 7/088* (2006.01)
*H04N 19/463* (2014.01)
(Continued)

(52) U.S. Cl.
CPC ....... *H04N 19/463* (2014.11); *H04L 29/0604* (2013.01); *H04L 29/06027* (2013.01); *H04L 65/4084* (2013.01); *H04L 65/607* (2013.01); *H04L 69/04* (2013.01); *H04N 7/025* (2013.01); *H04N 7/083* (2013.01); *H04N 7/084* (2013.01); *H04N 7/087* (2013.01); *H04N 7/0855* (2013.01); *H04N 7/0881* (2013.01); *H04N 19/00* (2013.01); *H04N 19/85* (2014.11);
(Continued)

(58) Field of Classification Search
CPC .... H04N 7/0881; H04N 7/0855; H04N 7/025; H04N 7/084; H04N 7/087; H04N 7/083
See application file for complete search history.

(56) References Cited

U.S. PATENT DOCUMENTS 6,115,077 A * 9/2000 Tsukagoshi ............. H04N 5/21
                                                      348/589
6,278,733 B1 * 8/2001 Bennett ............ H04N 21/23614
                                                      375/240

(Continued)

OTHER PUBLICATIONS

PCT International Search Report and Written Opinion, PCT Application No. PCT/US2015/015161, dated May 12, 2015, 14 pages.

(Continued)

*Primary Examiner* — Robert J Hance
(74) *Attorney, Agent, or Firm* — Fenwick & West LLP

(57) ABSTRACT

A transmitting device for communicating via a multimedia communication link includes a compression circuitry that receives blanking period data corresponding to blanking states of video blanking periods. The compression circuitry compresses the blanking period data into compressed blanking period data. The transmitting device also includes an interface that transmits signals corresponding to the compressed blanking period data via one or more multimedia channels of the multimedia communication link.

20 Claims, 14 Drawing Sheets

Related U.S. Application Data

(60) Provisional application No. 61/949,901, filed on Mar. 7, 2014.

(51) Int. Cl.

| | | |
|---|---|---|
| *H04N 21/4402* | (2011.01) | |
| *H04N 21/4363* | (2011.01) | |
| *H04N 19/85* | (2014.01) | |
| *H04N 7/083* | (2006.01) | |
| *H04N 21/2343* | (2011.01) | |
| *H04N 19/00* | (2014.01) | |
| *H04L 29/06* | (2006.01) | |
| *H04N 21/2662* | (2011.01) | |
| *H04N 7/085* | (2006.01) | |
| *H04N 7/084* | (2006.01) | |
| *H04N 7/087* | (2006.01) | |
| *H04N 7/025* | (2006.01) | |
| *H04N 19/93* | (2014.01) | |

(52) U.S. Cl.
CPC .. *H04N 21/234363* (2013.01); *H04N 21/2662* (2013.01); *H04N 21/43635* (2013.01); *H04N 21/440263* (2013.01); *H04N 19/93* (2014.11)

(56) References Cited

U.S. PATENT DOCUMENTS

| | | | |
|---|---|---|---|
| 6,996,096 | B2 | 2/2006 | Niida et al. |
| 7,009,533 | B1 | 3/2006 | Wegener |
| 7,236,177 | B2 | 6/2007 | Sih et al. |
| 8,000,350 | B2 | 8/2011 | Riedel et al. |
| 8,204,104 | B2 | 6/2012 | Matsubayashi |
| 8,341,168 | B1 | 12/2012 | Velthoen |
| 8,406,292 | B2 | 3/2013 | Shimada et al. |
| 8,699,581 | B2 | 4/2014 | Koyabu et al. |
| 2005/0078675 | A1* | 4/2005 | Nishikawa ............ H04N 7/088 370/389 |
| 2006/0120463 | A1 | 6/2006 | Wang |
| 2006/0209880 | A1 | 9/2006 | Chang et al. |
| 2006/0215994 | A1 | 9/2006 | Sasabe |
| 2007/0009060 | A1 | 1/2007 | Lavelle et al. |
| 2007/0200859 | A1 | 8/2007 | Banks et al. |
| 2007/0286246 | A1 | 12/2007 | Kobayashi |
| 2008/0080596 | A1 | 4/2008 | Inoue et al. |
| 2008/0240682 | A1 | 10/2008 | Egawa et al. |
| 2009/0295987 | A1* | 12/2009 | Wei ..................... H04N 7/088 348/435.1 |
| 2010/0309382 | A1* | 12/2010 | Matsubayashi ........ G09G 5/006 348/723 |
| 2010/0321466 | A1 | 12/2010 | Román |
| 2011/0234608 | A1 | 9/2011 | Funada |
| 2012/0008044 | A1* | 1/2012 | Nagata .................. H04N 5/445 348/478 |
| 2012/0166702 | A1 | 6/2012 | Toba et al. |
| 2013/0195160 | A1 | 8/2013 | Whitby-Strevens |
| 2013/0223456 | A1 | 8/2013 | Kim et al. |
| 2015/0326914 | A1* | 11/2015 | Semba ............. H04N 21/43615 725/78 |

OTHER PUBLICATIONS

PCT International Search Report and Written Opinion, PCT Application No. PCT/US2015/016711, dated May 22, 2015, 15 pages.

United States Office Action, U.S. Appl. No. 14/470,620, dated Mar. 7, 2017, ten pages.

* cited by examiner

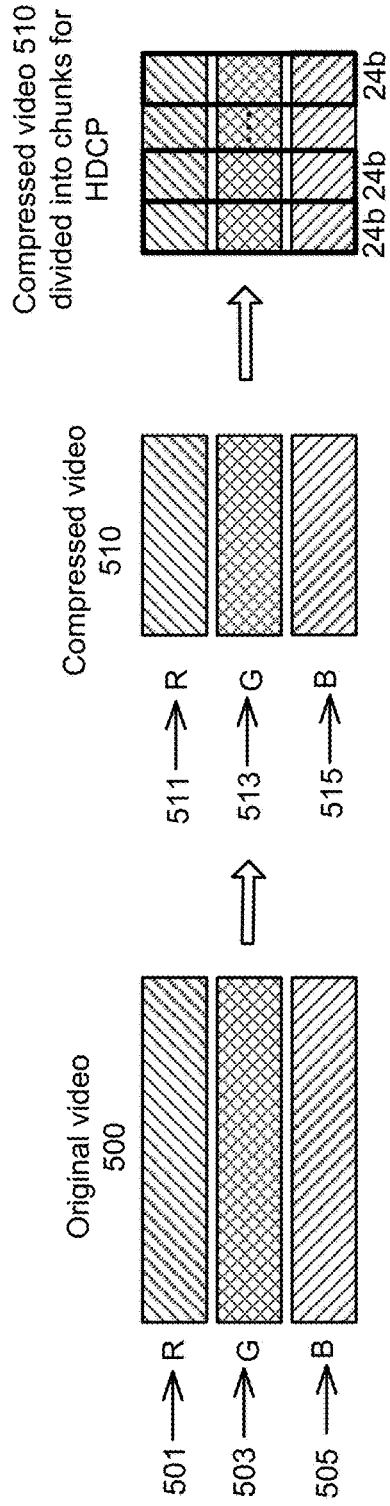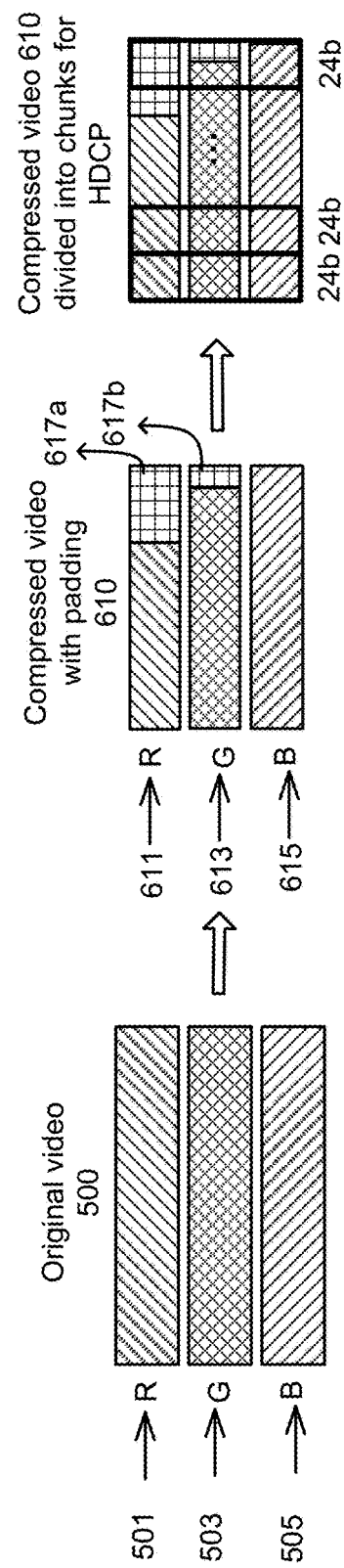

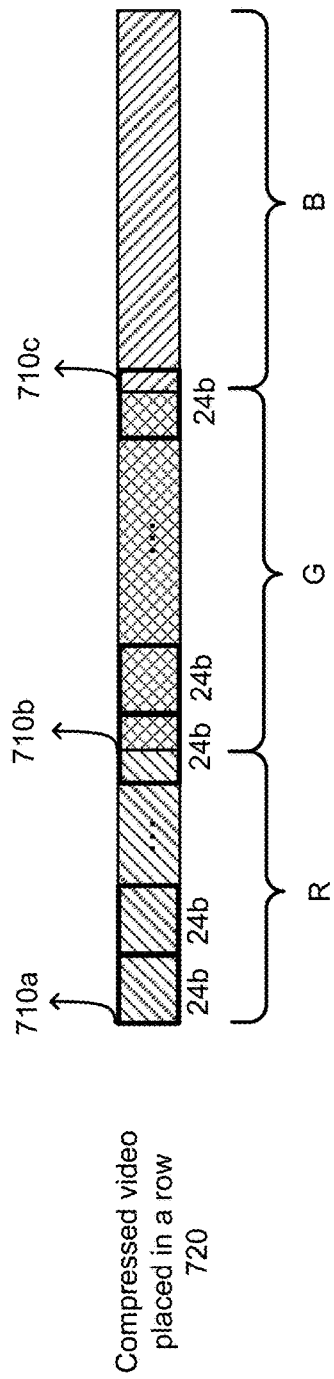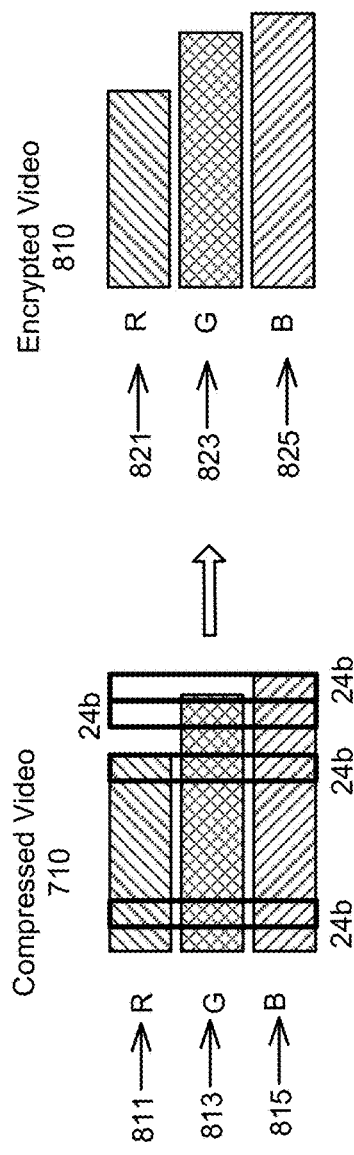
FIG. 7
FIG. 8

| Blanking Event | Blanking Event Code | | | | | |
|---|---|---|---|---|---|---|
| BS | 0 | 0 | 0 | 0 | 0 | 0 |
| HSS | 0 | 0 | 0 | 0 | 0 | 1 |
| HSE | 0 | 0 | 0 | 0 | 1 | 0 |
| VSS | 0 | 0 | 0 | 0 | 1 | 1 |
| VSE | 0 | 0 | 1 | 0 | 0 | 0 |

FIG. 9A

| Packet Bits | 7 | 6 | 5 | 4 | 3 | 2 | 1 | 0 | Notes |
|---|---|---|---|---|---|---|---|---|---|
| Field Name | PKT_TYPE | | | | ST | MHL_STREAM_ID | | | 1 |
| PKT_TYPE | Packet Type | | | | ST | Packet Content | | | |
| 0b0001 | Content | | | | 1 | Video Data Period Data | | | 2, 5 |
| | | | | | 0 | Blanking Period Data | | | |
| 0b0010 | Content Protection (CP) Control | | | | | Controls used by HDCP 2 content protection system | | | 3 |
| 0b0011 | Extended Content | | | | 1 | Video Data Period Data | | | 4, 5 |
| | | | | | 0 | Blanking Period Data | | | |
| 0b0111 | Compressed Content | | | | | Compressed Video Data | | | |

FIG. 13

COMPRESSED BLANKING PERIOD TRANSFER OVER A MULTIMEDIA LINK

CROSS-REFERENCE TO RELATED APPLICATION(S)

This application is a continuation of U.S. patent application Ser. No. 14/470,620, filed Aug. 27, 2014, which claims priority under 35 U.S.C. § 119 (e) to U.S. Provisional Patent Application Ser. No. 61/949,901, titled "Compressed Video Transfer Over HDMI and MHL," filed Mar. 7, 2014, all of which are incorporated herein by reference in their entirety.

BACKGROUND

1. Field of the Disclosure

Embodiments of the present disclosure generally relate to the field of electronic devices and, more particularly, to compressed video blanking period transfer over a High-Definition Multimedia Interface (HDMI) and Mobile High-Definition Link (MHL).

2. Description of the Related Art

HDMI (e.g., HDMI1, and HDMI2) and MHL (e.g., MHL1, MHL2, and MHL3) were designed to transfer uncompressed video (and audio) content from source devices to sink devices. The uncompressed video provides the best video quality as long as the link (e.g., HDMI and MHL) can support the full bandwidth (BW) needed. Recent advancements in display technology have increased demand for high resolution videos (e.g. 8 k). However, it is difficult to transfer such high resolution videos across conventional HDMI and MHL links due to bandwidth limitations. Especially, HDMI and MHL are not designed for compressed video content transfer. Therefore, there is a need for a solution to transfer compressed video content over the HDMI and MHL links.

SUMMARY

Embodiments of the present disclosure are generally directed to compressed video transfer over HDMI and MHL. In some embodiments, a transmitting device, a receiving device, or a non-transitory computer readable medium storing a representation of the transmitting device or the receiving device is disclosed for compressed video transfer over HDMI and MHL. The transmitting device comprises link layer circuitry to receive video data and to compress the video data into compressed video data; a compression information circuit to generate video compression control information describing compression of the video data; and an interface to transmit signals corresponding to the compressed video data via one or more multimedia channels of the multimedia communication link and to transmit signals corresponding to the video compression control information via the multimedia communication link.

In one embodiment, the video compression control information includes compression parameters used during the compression of the video data. In one embodiment, the video compression control information is transmitted as a preamble or a leading guard band preceding a video transmission period of the compressed video data. In one embodiment, the video compression control information is transmitted in a data island during a blanking period. In one embodiment, the video compression control information is transmitted via the one or more multimedia channels of the multimedia communication link. In one embodiment, the video compression control information is transmitted via a control channel of the multimedia communication link.

In one embodiment, the active video data includes a plurality of color components, and the link layer circuitry is configured to compress lines of the color components into compressed lines of the color components that have same length. In one embodiment, the active video data includes a plurality of color components, and the link layer circuitry is configured to compress lines of the color components into compressed lines of the color components and pad one or more padding bits onto the compressed lines of the color components until the compressed lines have same length. In one embodiment, the active video data includes a plurality of color components, and the link layer circuitry is configured to compress lines of the color components into compressed lines of the color components and encrypt the compressed lines of the color components in serial order into encrypted video data, and the signals corresponding to the compressed video data transmitted by the interface are signals corresponding to the encrypted video data.

Other embodiments of the present disclosure are a receiving device for communicating via a multimedia communication link. The receiving device comprises an interface to receive signals corresponding to compressed video data via one or more multimedia channels of the multimedia communication link and to receive signals corresponding to video compression control information via the multimedia communication link, the video compression control information describing compression of the compressed video data; and link layer circuitry to decompress the compressed video data into video data based the video compression control information describing compression of the compressed video data.

In one embodiment, the video compression control information includes compression parameters used during compression of the video data. In one embodiment, the video compression control information is received as a preamble or a leading guard band preceding a video transmission period of the compressed video data. In one embodiment, the video compression control information is received in an data island during a blanking period. In one embodiment, the video compression control information is received via the one or more multimedia channels of the multimedia communication link. In one embodiment, the video compression control information is received via a control channel of the multimedia communication link.

In one embodiment, the compressed video data includes compressed lines of color components that have same length. In one embodiment, the compressed video data includes compressed lines of color components that have padding bits, the link layer circuitry removing the padding bits when decompressing the compressed video data. In one embodiment, the signals corresponding to the compressed video data are signals corresponding to encrypted video data and the link layer circuitry decrypts the encrypted video data into decrypted video data and separates the decrypted video data into lines for different color components.

According to another embodiment of the present disclosure, a non-transitory computer readable medium storing a representation of a transmitting device is provided. The transmitting device comprises link layer circuitry to receive active video data and to compress the active video data into compressed video data; a compression information circuit to generate video compression control information describing compression of the active video data; and an interface to transmit signals corresponding to the compressed video data via one or more multimedia channels of the multimedia communication link and to transmit signals corresponding to the video compression control information via the multimedia communication link.

According to yet another embodiment of the present disclosure, a non-transitory computer readable medium storing a representation of a receiving device is provided. The receiving device comprises an interface to receive signals corresponding to compressed video data via one or more multimedia channels of the multimedia communication link and to receive signals corresponding to video compression control information via the multimedia communication link, the video compression control information describing compression of the compressed video data; and link layer circuitry to decompress the compressed video data into video data based the video compression control information describing compression of the compressed video data.

According to additional embodiments of the present disclosure, a transmitting device for communicating via a multimedia communication link is provided. The transmitting device comprises compression circuitry to receive blanking period data corresponding to blanking states of video blanking periods, the compression circuitry compressing the blanking period data into compressed blanking period data; and an interface to transmit signals corresponding to the compressed blanking period data via one or more multimedia channels of the multimedia communication link.

In one embodiment, the compression circuitry generates blanking compression information describing compression of the compressed blanking period data, and the interface transmits the blanking compression information via the multimedia communication link. In one embodiment, the compressed blanking period data includes blanking events indicative of state changes within the blanking period data. In one embodiment, the compression circuitry compresses the blanking period data by applying run length coding on the blanking period data to generate the compressed blanking data.

In one embodiment, for at least one video blanking period, the compression circuitry compresses the blanking period data for the video blanking period by dividing the blanking period data into different portions that are separated by data islands and separately compressing each of the different portions. In one embodiment, for a least one video blanking period, that includes data islands, the compression circuitry compresses the blanking period data for the video blanking period by compressing the blanking period data into a single set of timing information describing the states of the blanking period data. In one embodiment, the transmitting device replaces additional video blanking periods with compressed video data, the interface transmitting signals corresponding to the compressed video data via the one or more multimedia channels of the multimedia communication link.

According to yet additional embodiments of the present disclosure, a receiving device for communicating via a multimedia communication link is provided. The receiving device comprises an interface to receive, via one or more multimedia channels of the multimedia communication link, signals corresponding to compressed blanking period data; and decompression circuitry to decompress the compressed blanking period data into blanking period data corresponding to states of video blanking periods.

In one embodiment, the interface also receives, via the multimedia communication link, blanking compression information describing compression of the compressed blanking period data, and wherein the decompression circuitry decompresses the compressed blanking period data based on the blanking compression information. In one embodiment, the compressed blanking period data includes blanking events indicative of state changes within the blanking data. In one embodiment, the compressed blanking period data is decompressed by applying run length decoding on the compressed blanking period data to generate the blanking period data.

In one embodiment, for a least one video blanking period, the compressed blanking period data for the video blanking period includes different portions that are separated by data islands, and the decompression circuit decompresses the portions into the blanking period data. In one embodiment, for a least one video blanking period that includes data islands, the compressed blanking period data for the video blanking period includes a single set of timing information corresponding to the states of the blanking period data, and the decompression circuit decompresses the single set of timing information into the blanking period data.

According to another embodiment of the present disclosure, a non-transitory computer readable medium storing a representation of a transmitting device is provided. The transmitting device comprises compression circuitry to receive blanking period data corresponding to blanking states of video blanking periods, the compression circuitry compressing the blanking period data into compressed blanking period data; and an interface to transmit signals corresponding to the compressed blanking period data via one or more multimedia channels of the multimedia communication link.

In one embodiment, the compression circuitry generates blanking compression information describing compression of the compressed blanking period data, and the interface transmits the blanking compression information via the multimedia communication link. In one embodiment, the compressed blanking period data includes blanking events indicative of state changes within the blanking period data. In one embodiment, the compression circuitry compresses the blanking period data by applying run length coding on the blanking period data to generate the compressed blanking data.

In one embodiment, for at least one video blanking period, the compression circuitry compresses the blanking period data for the video blanking period by dividing the blanking period data into different portions that are separated by data islands and separately compressing each of the different portions. In one embodiment, for a least one video blanking period, that includes data islands, the compression circuitry compresses the blanking period data for the video blanking period by compressing the blanking period data into a single set of timing information describing the states of the blanking period data.

According to yet another embodiment of the present disclosure, a non-transitory computer readable medium storing a representation of a receiving device is provided. The receiving device comprises an interface to receive, via one or more multimedia channels of the multimedia communication link, signals corresponding to compressed blanking period data; and decompression circuitry to decompress the compressed blanking period data into blanking period data corresponding to states of video blanking periods.

In one embodiment, the interface also receives, via the multimedia communication link, blanking compression information describing compression of the compressed blanking period data, and wherein the decompression circuitry decompresses the compressed blanking period data based on the blanking compression information.

Embodiments of the preset disclosure describe how to transfer compressed video data over a link such as HDMI or MHL. This will enable MHL3 and HDMI2 to carry higher resolutions of contents (such as 8K) with current physical layers (PHYs) and enable lower power consumption for the same resolutions.

BRIEF DESCRIPTION OF THE DRAWINGS

The teachings of the embodiments disclosed herein can be readily understood by considering the following detailed description in conjunction with the accompanying drawings.

FIG. 5 is a diagram illustrating a first way for handling compressed video data, according to one embodiment.

FIG. 6 is a diagram illustrating a second way for handling compressed video data, according to one embodiment.

FIG. 7 is a diagram illustrating a third way for handling compressed video data, according to one embodiment.

FIG. 8 is a diagram illustrating a fourth way for handling compressed video data, according to one embodiment.

FIGS. 9A-9C are diagrams illustrating three examples for blanking period compression, according to one embodiment.

FIG. 13 is a chart illustrating the packet header bytes of a MHL3 stream packet, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure use compression to transfer video data and blanking data across a multimedia communication link, which has several advantages. First, with the same link technology (e.g., with the same BW), a higher resolution can be supported, e.g., 4K resolution is possible for the current 1080p link with 4 times compression. Second, for the same resolution, compression makes less power consumption possible. Third, for the same resolution, fewer physical pins or wires are required for transferring compressed data than uncompressed data. Specifically, the first advantage especially benefits Customer Electronics (CE) products, while the second and third advantages are important for mobile devices. The following description figures show how compressed video data and blanking data can be transferred over a multimedia communication link.

Figure 1:
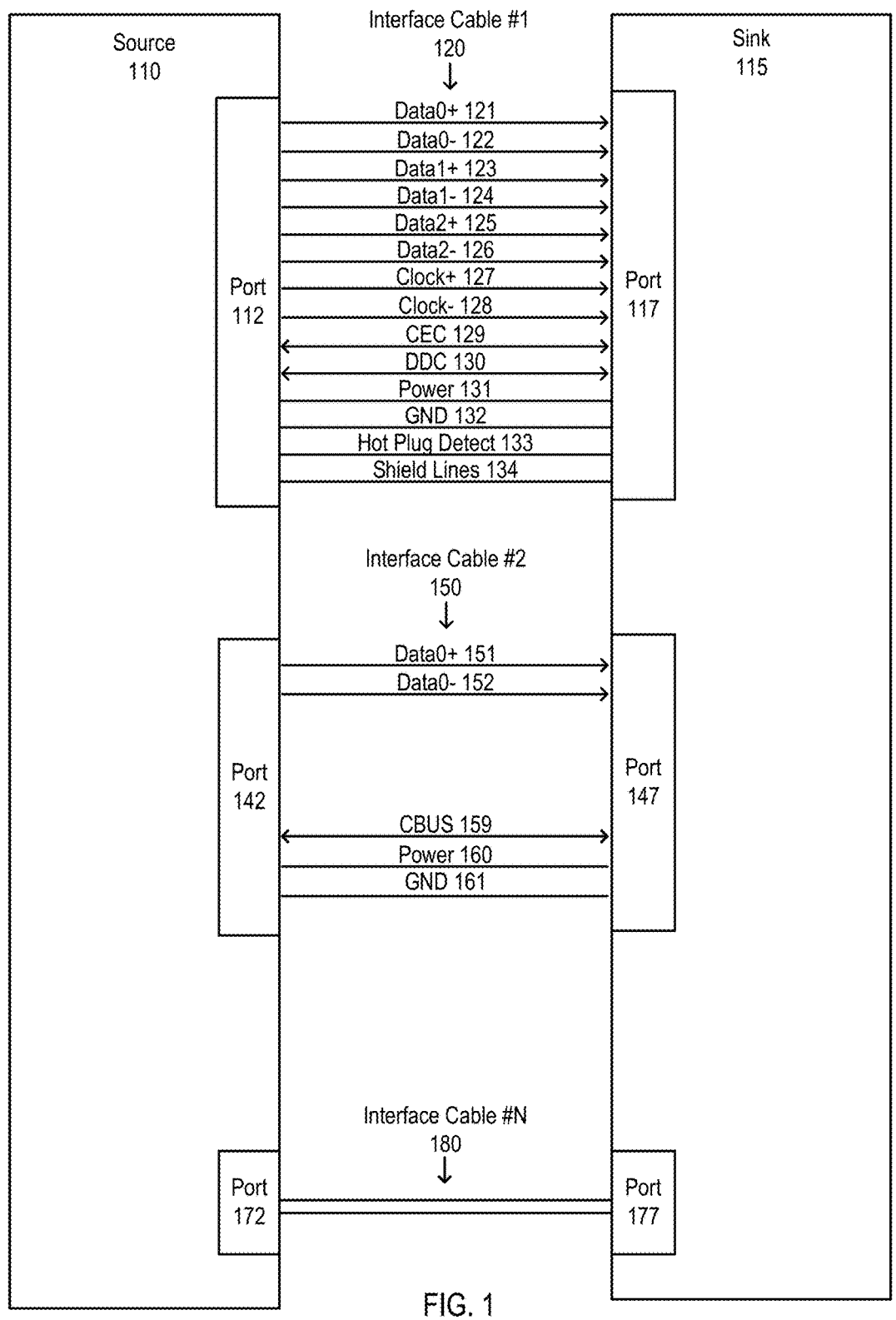
FIG. 1 is a high-level block diagram of a system for data communications, according to one embodiment.

FIG. 1 is a high-level block diagram of a system 100 for data communications, according to one embodiment. The system 100 includes a source device 110 communicating with a sink device 115 through one or more interface cables 120, 150, 180. Source device 110 transmits multimedia data streams (e.g., audio/video streams) to the sink device 115 and also exchanges control data with the sink device 115 through the interface cables 120, 150, 180. In one embodiment, source device 110 and/or sink device 115 may be repeater devices.

Source device 110 includes physical communication ports 112, 142, 172 coupled to the interface cables 120, 150, 180. Sink device 115 also includes physical communication ports 117, 147, 177 coupled to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. Each pair of differential data lines represents a single multimedia communication channel. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 844 for the differential signals. In some embodiments, the sink device 115 may utilize the CEC control bus 129 for the transmission of closed loop feedback control data to source device 110.

In one embodiment, interface cable 150 represents a Mobile High-Definition Link (MHL) cable. The MHL cable 150 supports differential signals transmitted via data0+ line 151 and data0− line 152. In the illustrated embodiment of MHL, there is only a single pair of differential data lines (e.g., 151 and 152). Embedded common mode clocks are transmitted through the differential data lines. The MHL cable 150 may further include a control bus (CBUS) 159, power 160 and ground 161. The CBUS 159 carries control information such as discovery data, configuration data and remote control commands.

Embodiments of the present disclosure relate to transfer of compressed video data and compressed video blanking period data over the multimedia channels of a multimedia communication link such as HDMI or MHL. This will enable MHL3 and HDMI2 to carry higher resolution content (such as 8K) with current PHYs and enable lower power consumption for the same resolutions.

In one embodiment, a representation of the source device 110, the sink device 115, or components within the source device 110 or sink device 115 may be stored as data in a non-transitory computer-readable medium (e.g. hard disk drive, flash drive, optical drive). These representations may be behavioral level, register transfer level, logic component level, transistor level and layout geometry-level descriptions.

Figure 2:
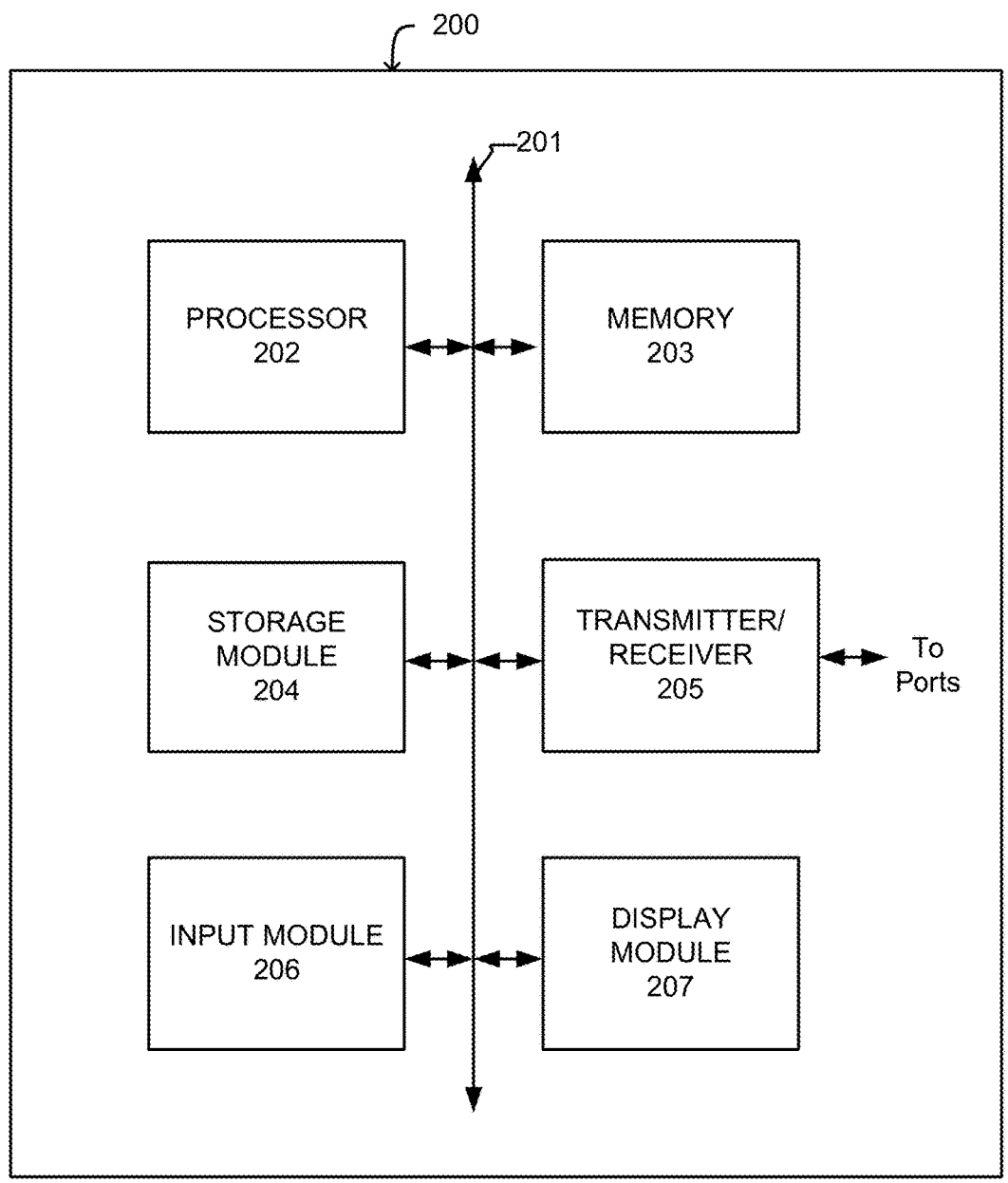
FIG. 2 is a detailed view of a computing device suitable for use as the source device or sink device from FIG. 1, according to one embodiment.

FIG. 2 is a detailed view of a computing device 200 suitable for use as the source device 110 or sink device 115 from FIG. 1, according to one embodiment. The computing device 200 can be, for example, a cell phone, a television, a laptop, a tablet, etc. The computing device 200 includes components such as a processor 202, a memory 203, a storage module 204, an input module (e.g., keyboard, mouse, and the like) 206, a display module 207 (e.g. liquid crystal display, organic light emitting display, and the like) and a transmitter or receiver 205, exchanging data and control signals with one another through a bus 201.

The storage module 204 is implemented as one or more non-transitory computer readable storage media (e.g., hard disk drive, solid state memory, etc.), and stores software instructions that are executed by the processor 202 in conjunction with the memory 203. Operating system software and other application software may also be stored in the storage module 204 to run on the processor 202.

The transmitter or receiver 205 is coupled to the ports for reception or transmission of multimedia data and control data. Multimedia data that is received or transmitted may include video data streams or audio-video data streams, such as HDMI and MHL data. The multimedia data may be encrypted for transmission using an encryption scheme such as HDCP (High-Bandwidth Digital-Content Protection). Transmitter or receiver the receiver may include various circuits such as interface circuits to interface with the MHL/HDMI links and a compression engine to compress and decompress video data.

Figure 3:
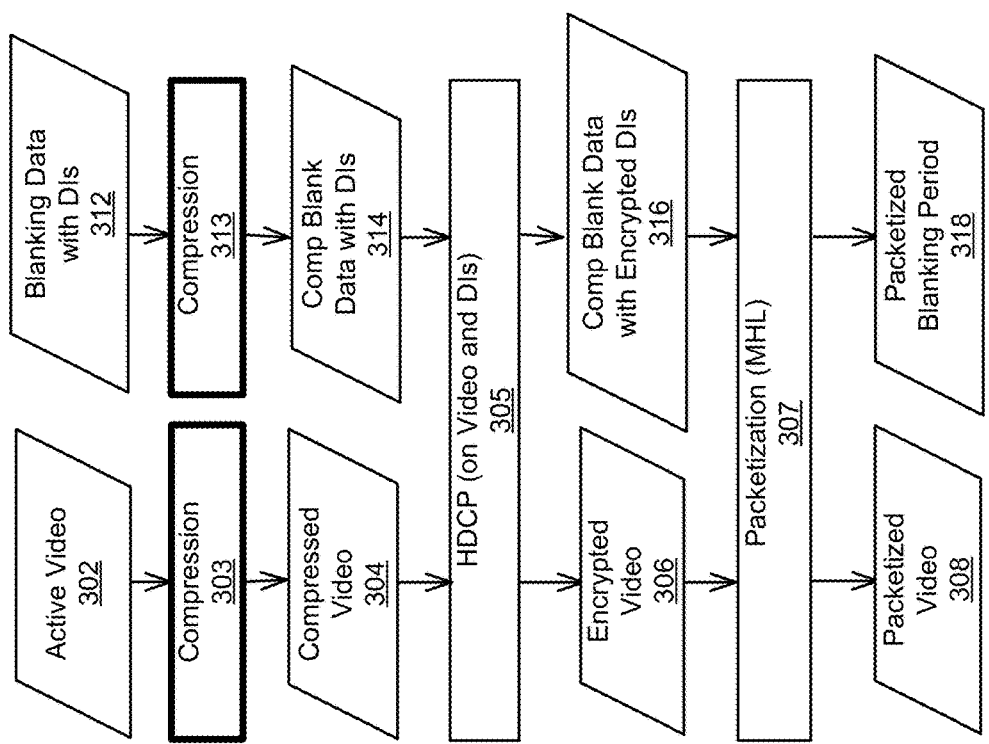
FIG. 3 is a flow diagram illustrating a data path for transferring compressed data over HDMI and MHL, according to one embodiment.

Referring now to FIG. 3, illustrated is a flow diagram illustrating a data path for transferring compressed data over HDMI and MHL, according to one embodiment. The illustrated embodiment of the data path in FIG. 3 shows a data flow for handling compressed video data, as well as a data flow for handling a compressed blanking period data.

Initially the data path for video compression starts with active video data 302. Active video data 302 can be data or data stream representing the video. For example, active video data 302 can include video data for multiple video frames. The active video data 303 is compressed into compressed video data 304. The compressed video data 304 is then encrypted 305 into encrypted video data 306

The data path for blanking period compression starts with blanking period data and data islands DIs 312, which together make up a blanking period. A blanking period can include a vertical blanking period and/or a horizontal blanking period. A vertical blanking period contains a vertical sync pulse that signifies a new frame, and a horizontal blanking period contains a horizontal sync pulse that signifies a new line within the frame. States within the vertical blanking period and horizontal blanking period are represented by the blanking period data. In one embodiment, data islands can occur during the horizontal and/or vertical blanking periods. During a data island, audio and/or auxiliary data can be transmitted within a series of packets. The blanking period data 312 is compressed 313, which results in compressed blanking period data with data islands 314. The data islands are encrypted 305 using HDCP to obtain encrypted data islands. The result is compressed blanking period data with encrypted data islands 316.

In addition, according to the illustrated data flow in FIG. 3, the encrypted video 306 may be packetized 307 to generate packetized video 308. The compressed blanking data with encrypted DIs 316 may be packetized 307 to generate a packetized blanking period 318. The packetization stage (e.g., indicated by 307) may only be included in embodiments that use MHL3, whereas embodiments that use HDMI and earlier versions of MHL may not have the packetization stage.

Figure 4A:
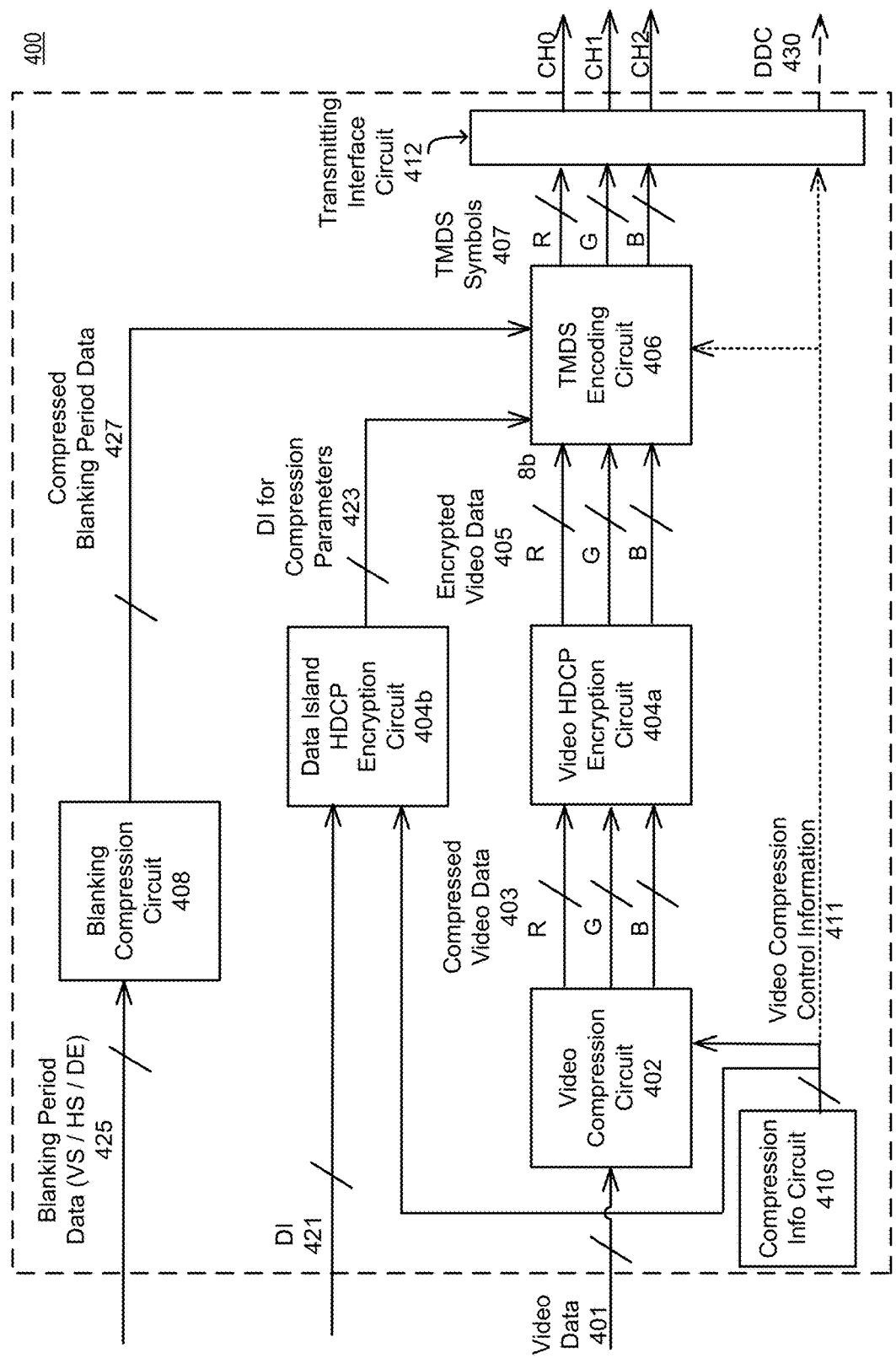
FIG. 4A is a circuit diagram illustrating a transmitter for transmitting compressed data over HDMI, according to one embodiment.

Referring to FIG. 4A now, illustrated is a circuit diagram of a transmitter 400 for transmitting compressed data over HDMI, according to one embodiment. The illustrated transmitter 400 includes a video compression circuit 402, a video HDCP encryption circuit 404a, a data island HDCP encryption circuit 404b, a transition-minimized differential signaling (TMDS) encoding circuit 406, a blanking compression circuit 408, a compression information circuit (compression info circuit) 410 and a transmitting interface circuit 412. In one embodiment, one or more of the components of the transmitter 400 may be part of a data link layer of HDMI or MHL. Therefore, the one or more components may also be referred to as "link layer circuitry". Those of skill in the art will recognize that other embodiments of the transmitter 400 in FIG. 4A can have different and/or additional circuits other than the ones described here, and that the functions may be distributed among the modules in a different manner.

The video compression circuit 402 receives active video data 401 and compresses the video data 401 into compressed video data 403. The active video data 401 may include separate R, G and B video data 401, which is compressed into compressed R, G, B video data 403. In one embodiment, the video compression circuit 402 may be controlled by the compression information circuit 410 to implement the compression of the video data 401. For example, video compression circuit 402 receives, from the compression information circuit 410, video compression control information 411 describing compression parameters that affect the compression of the video data. Examples of compression parameters include a compression rate defining an amount of compression and a compression algorithm identifying a specific compression algorithm to be used. The video compression circuit 402 compresses the video data 401 based on the video compression control information 411.

The video HDCP encryption circuit 404a receives the compressed video data 403 from the video compression circuit 402 and encrypts the compressed video data 403 using HDCP to generate encrypted video data 405.

The data island HDCP encryption circuit 404b receives data for one or more data islands 421 of a blanking period and encrypts the data islands 421 using HDCP. The data island HDCP encryption circuit 404b also receives video compression control information 411 from the compression information circuit 410 and uses the received video compression control information 411 to generate information frames describing the compression parameters used by the video compression circuit 402. For example, the data island HDCP encryption circuit 404b generates data islands for compression parameters 423 based on the video compression control information 411. In one embodiment, the video HDCP encryption circuit 404a and the data island HDCP encryption circuit 404b can be the same circuit implementing the encryption of the video data 401 as well as the data islands 421.

The TMDS encoding circuit 406 receives encrypted video data 405 and encodes the encrypted video data 405 into TMDS symbols 407 for transfer through the transmitting interface circuit 412 and the multimedia communication link. For example, the TMDS encoding circuit 406 implements an 8 b/10 b encoding of the video data 401, mapping 8-bit symbols to 10-bit symbols. In one embodiment, the TMDS encoding circuit 406 also receives the data islands for compression parameters 423 and other compressed blanking periods 427 output by the blanking compression circuit 408 and converts these into 10-bit symbols. In some embodiments the TMDS encoding circuit 406 also receives the video compression control information 411 and uses this information to generate preambles or leading guard bands that include the video compression information 411.

The blanking compression circuit 408 receives blanking period data 425 and compresses the blanking period data 425 to generate compressed blanking period data 427. The blanking period data 425 indicates the blanking state (e.g., front porch, synchronization pulse, back porch) that the blanking period is currently in. The blanking period data 425 is transferred through one or more signals such as a vertical sync (VS) signal, a horizontal sync (HS) signal, and a data enable (DE) signal. The blanking period can also be referred to as a "SYNC period" and the blanking states may also be referred to as "SYNC states."

As illustrated in FIG. 4A, the compressed blanking period data 427 is output to the TMDS encoding circuit 406 that encodes the compressed blanking period data 427 into TMDS symbols for transmission by the transmitting interface circuit 412 via a multimedia communication link between the transmitter 400 and the receiver 450. In one embodiment, the blanking compression circuit 408 may also generates blanking compression information describing the compression of the compressed blanking period data 427. The blanking compression information may be transmitted to the receiver via the interface circuit 412 and the multimedia communication link.

The transmitting interface circuit 412 serializes TMDS symbols 407 into differential signals for each multimedia communication channel and transmits the differential signals over various multimedia communication channels of a multimedia communication link. The transmitting interface circuit 412 thus transmits signals representing compressed video data 403, compression control information 411, compressed blanking period data 427, blanking compression information, and data islands among other types of information within the receiver 400.

In one embodiment, the transmitting interface circuit 412 may also receive the video compression control information 411 from the compression information circuit 410 (shown with dotted arrow in FIG. 4A), and transmit the video compression control information 411 as signals via a DDC channel 430 of the multimedia communication link. For example, the DDC channel 430 is a separate control channel that is different from the multimedia channel or channels used to transmit TMDS symbols 407.

In the case of MHL, the compressed R, G, B video data represented by the TMDS symbols 407 are transmitted in series across a single multimedia channel. Additionally, the video compression control information 411 may be transmitted across a CBUS channel instead of DDC.

Figure 4B:
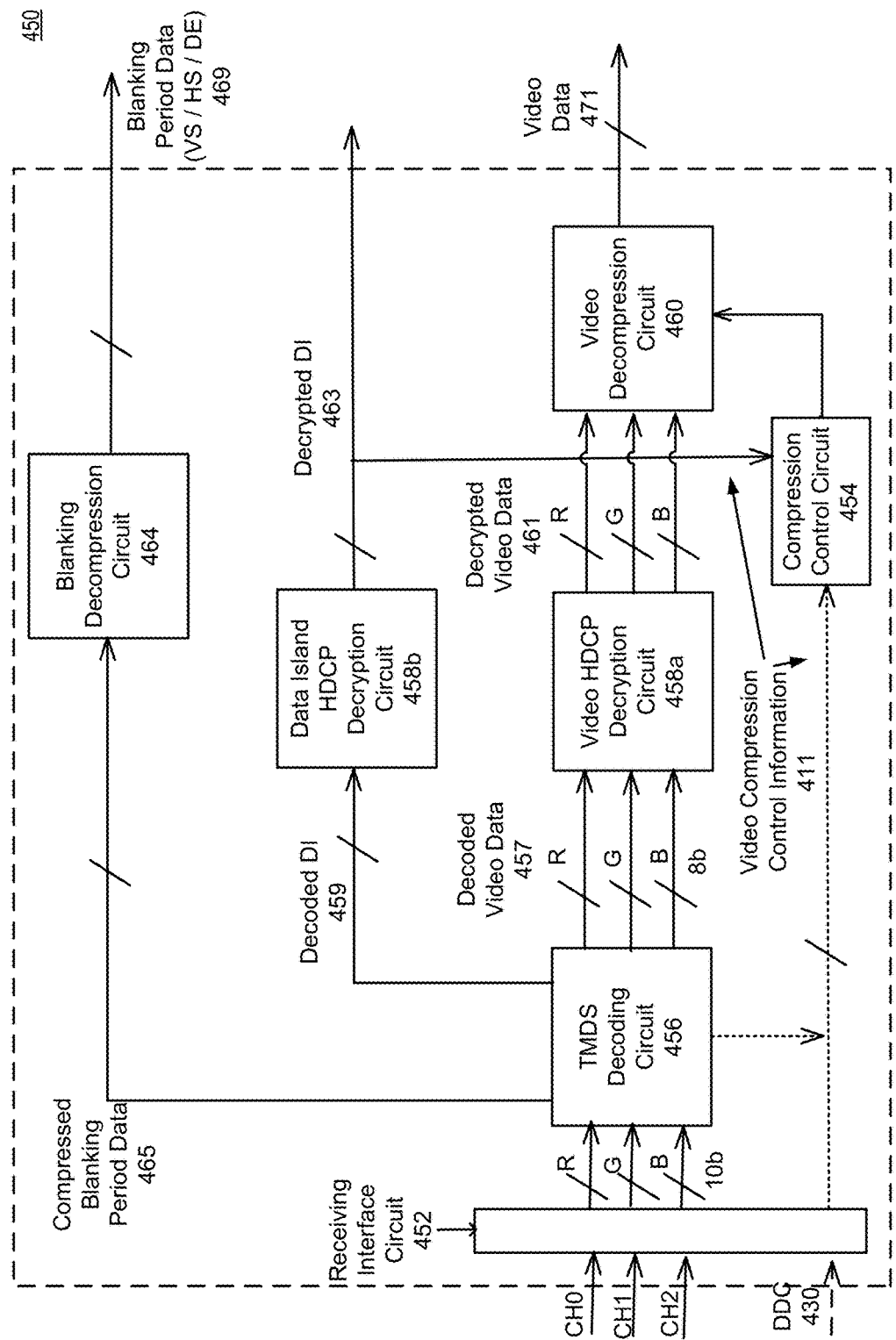
FIG. 4B is a circuit diagram illustrating a receiver for decompressing received compressed data transmitted over HDMI, according to one embodiment.

FIG. 4B is a circuit diagram illustrating a receiver 450 for decompressing compressed data transmitted over HDMI, according to one embodiment. The illustrated receiver 450 includes a receiving interface circuit 452, a compression control circuit 454, a TMDS decoding circuit 456, a video HDCP decryption circuit 458*a*, a data island HDCP decryption circuit 458*b*, a video decompression circuit 460, and a blanking decompression circuit 464. In one embodiment, one or more of the components of the receiver 450 may be stored in the data link layer of HDMI or MHL. Therefore, the one or more components may also be referred to as "link layer circuitry". Those of skill in the art will recognize that other embodiments of the receiver 450 in FIG. 4B can have different and/or additional circuits other than the ones described here, and that the functions may be distributed among the circuits in a different manner.

The receiving interface circuit 452 receives incoming signals from the transmitter 400 via multimedia channels of the multimedia communication link. The signals represent TMDS symbols that are used to transfer information such as compressed video data, compressed blanking period data 465, video compression control information 411 describing the compression of the active video data 401, and blanking compression information describing the compression of the compressed blanking period data 465. The receiving interface circuit 452 deserializes the signals into TMDS symbols.

The TMDS decoding circuit 456 receives the TMDS symbols and applies TMDS decoding on the symbols. The TMDS decoding circuit 456 outputs the decoded video data 457 to the video HDCP decryption circuit 458*a*, the decoded data islands 459 to the data island HDCP decryption circuit 458*b*, and the compressed blanking period data 465 to the blanking decompression circuit 464. The video HDCP decryption circuit 458*a* and the data island HDCP decryption circuit 458*b* decrypt the data (e.g., the decoded video data 457, the decoded DI 463) received from the TMDS decoding circuit 456, respectively. The video HDCP decryption circuit 458*a* outputs the decrypted video data 461 to the video decompression circuit 460. The data island HDCP decryption circuit 458*b* outputs the decrypted data islands 463 to the compression control circuit 454.

In one embodiment, the decrypted data islands 463 can include video compression control information 411 that is provided to the compression control circuit 454. In another embodiment, the video compression control information 411 (shown with dotted arrow) is received via the DDC instead. In yet another embodiment, the video compression control information 411 (shown with dotted arrow) is in a preamble of a control period or in a leading guard band of a video data period, which is extracted by the TMDS decoding circuit 456. The compression control circuit 454 uses the compression parameters in the compression control information 411 to control how the video decompression circuit 460 decompresses the decrypted video data 461.

The blanking decompression circuit 464 decompresses the compressed blanking period data 465 received from the TMDS decoding circuit 456 to generate the blanking period data 469. The video decompression circuit 460 decompresses the decrypted video data 461 under control of the compression control circuit 454 and outputs the video data 471.

In the case of MHL, the R, G, B video data are received in a series across a single multimedia communication channel. Additionally, the video compression control information 411 may be transmitted across a CBUS channel instead of DDC.

To enable video transfer, there are a couple of technical issues solved by the present disclosure. Some are common to all links (HDMI and MHL), while some are specific for each link. This disclosure starts with the common parts: video compression and blanking compression. The disclosure then describes the link specific part.

Compressed Video Handling

Compressed video handling relates to how to align the compressed data to the data path that assumes a 24 b data chunk (e.g., HDCP step in FIG. 3). There are at least four possible ways to compress video data. In one embodiment, the first two ways, as illustrated in FIGS. 5 and 6, are preferred for HDMI and MHL, while the last two ways, as illustrated in FIGS. 7 and 8, are preferred for MHL3.

FIG. 5 is a diagram illustrating a first way for handling compressed video data, according to one embodiment. For example, the original video 500 includes color components R 501, G 503, B 505 and/or other components such as Y, Cb and Cr (not pictured). Each component 501, 503, 505 includes a line of video data, such as 8 bits×1000 pixels=8000 bits of data per line.

A video compression circuit, such as 402 illustrated in FIG. 4A, may compress the original video data 500, and therefore result in compressed video 510 having lines of compressed video components R 511, G 513, B 515, and/or other compressed components such as Y, Cb and Cr (not pictured). The compressed video components R 511, G 513, B 515 each have the same compressed line size, and can be aligned with a byte boundary 517. For example, video component R 501 with 8000 bits in a line can be compressed using 2:1 compression into a compressed video component R 511 with 4000 bits in a line. A 4000 bit line is an exact multiple of 8 bits, which means the line is aligned with a byte boundary.

In such a case, a video HDCP encryption circuit, such as 404a illustrated in FIG. 4A, can perform HDCP encryption on the compressed video data 510 at the 24 b chunk level without knowing that the data 510 is compressed data. In other words, the HDCP encryption can be performed on 24 b chunks of compressed data that include 8 bits of R, 8 bits of G, and 8 bits of B. This allows for conventional HDCP circuits to be re-used with compression without redesigning the HDCP logic.

In another embodiment, a video compression circuit, such as 402 illustrated in FIG. 4A, may compress the original video 500 including RGB components separately, which results in different line sizes for each component R, G, B. For example, the compressed video may have compressed R, G, and B components with different line lengths. In such a case, there can be three different approaches for handling compressed video data, as is now explained by reference to FIGS. 6, 7 and 8.

FIG. 6 is a diagram illustrating a way for handling compressed video data, according to another embodiment. In the illustrated embodiment in FIG. 6, a HDCP encryption circuit, such as the video HDCP encryption circuit 404a in FIG. 4A, pads 0s 617a, 617b onto one or more components (e.g., R, G) of the compressed video to obtain compressed video with padding 610 that includes components (with padded zero bits) 611, 613, 615, respectively. The padding ensures that each component line has the same line size and is byte aligned. In this way, a HDCP encryption circuit, such as 404a illustrated in FIG. 4A, can perform HDCP encryption on the compressed video with padding 610 at the 24 b chunk level. However, this approach may result in wasting of a portion of the bandwidth by padding zeroes to components of video data On the receiving end, the video decompression circuit 460 removes the padding bits 617a, 617b when decompressing decrypted video data. The lines of compressed components R, G and B can then be decompressed into the original video 500.

FIG. 7 is a diagram illustrating a way for handling compressed video data, according to a further embodiment. This illustrated embodiment puts lines of compressed R, G and B components in a row 720. HDCP encryption is then applied to the row 720 such that the lines of compressed R, G and B components are serially encrypted one 24 b chunk at a time. In such a case, a boundary marker 710a, 710b, 710c is inserted between the components and indicates a boundary between two adjacent components.

This embodiment is typically used in MHL where all through color components R, G and B are transmitted serially across a single communication channel using packets. Additionally, in a MHL environment, the encrypted video data would be packetized before it is transmitted across a single MHL communication channel. In other embodiments of MHL that may have multiple communication channels, the resulting packets may be spread across multiple communication channels.

On the receiving end, the decryption circuit 458a decrypts decoded video data to generate a row 702 of compressed video. The row 720 of compressed video is then separated into different compressed lines of color components R, G, B by identifying the boundary markers 710a, 710b, 710c and separating the color components R, G, B along the boundary markers 710a, 710b, 710c. The separate compressed lines of color components R, G, B are then decompressed by the video decompression circuit 460.

FIG. 8 is a diagram illustrating a way for handling compressed video data, according to yet another embodiment. In the illustrated embodiment, the compressed video 710 has compressed components R 811, G813, B 815 with different line sizes. HDCP encryption is performed in a 24 b chunk level on the compressed video 710. For the part of the compressed components, e.g, R 811, G, 813, that does not have any data to encrypt, the corresponding bits of HDCP cipher value produced by the HDCP encryption circuit 404a are just discarded. The result is an encrypted video 810 with three encrypted video components R 821, G 823, B 825 having different line sizes. Each component may be packetized and sent one after another across a single MHL communication channel. In other embodiments of MHL that may have multiple communication channels, the resulting packets may be spread across multiple communication channels.

Blanking Period Compression

The video compression engines deal with only the active video part of the data. However, the overall compression ratio of data transferred across a multimedia link (e.g. HDMI or MHL) is also affected by the blanking period. For example, if the blanking period uses 20% of the bandwidth, 2:1 compression of video data will result in 0.2+0.8× 0.5=0.6, i.e., 40% compression rate, which is less than a 2:1 compression rate. There are a couple of ways to alleviate this problem by compressing the blanking period.

The first way of compressing the blanking period is (1) to replace the blanking period data with blanking events indicating state changes within a blanking period and (2) to reduce the time between the blanking events. As defined above, the blanking periods can be horizontal blanking periods or vertical blanking periods, which may also be referred to as horizontal SYNC (HS) periods and vertical SYNC (VS) periods. In one embodiment, the blanking compression circuit 408, as illustrated in FIG. 4A, compresses blanking period data into one or more of a blanking period start (BS) event, a horizontal SYNC start (HSS) event, a horizontal SYNC end (HSE) event, a vertical SYNC start (VSS) event and a vertical SYNC end (VSE) event. The BS event, HSS event, HSE event, VSS event and VSE event indicate the start or end of different specific blanking states (i.e. changes between states). Therefore, these events may be referred to collectively as blanking events.

Figure 9:
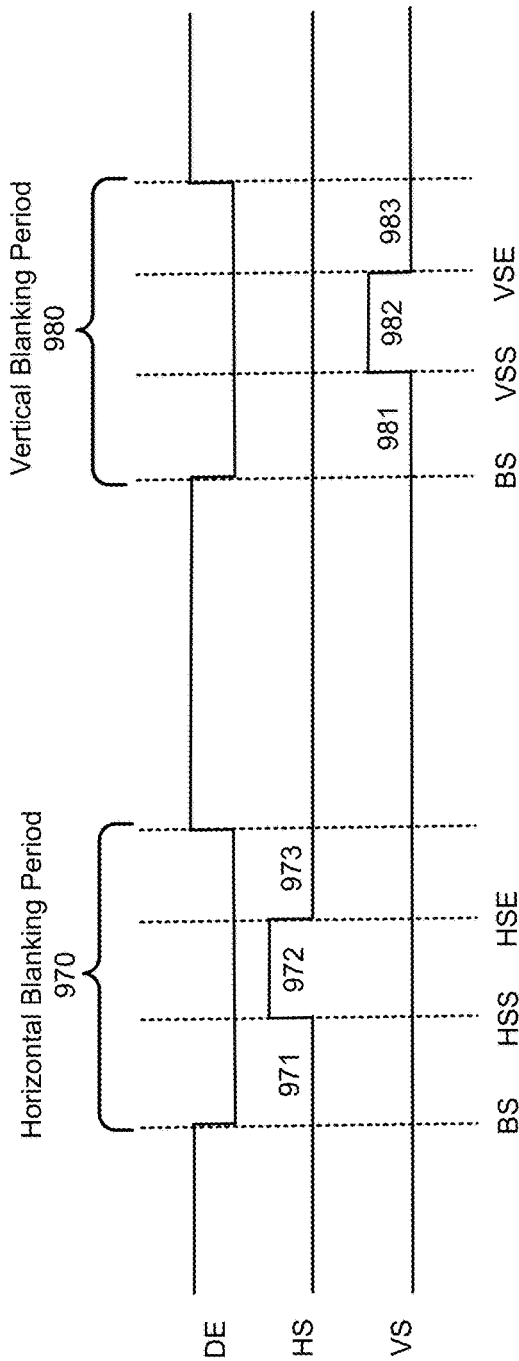
FIG. 9 illustrates compression of blanking periods into blanking events, according to one embodiment.

FIG. 9 illustrates compression of blanking period data into blanking events, according to an embodiment. FIG. 9 includes three signals, DE, HS and VS, which are used to carry blanking period data 425. Blanking periods 970, 980 occur when the DE signal is low, and active video periods occur when the DE signal is high. Data islands are not shown in FIG. 9, but would be transmitted sometime during the blanking periods 970 and 980.

Horizontal blanking period (HBLK) 970 begins when DE goes low. The HBLK period 970 ends when DE goes high. The HBLK period 970 includes different states: a front porch 971, a HS pulse 972 that signifies a new line within a frame, and a back porch 973. Each of these states may be multiple clock cycles in length. The HBLK period 970 is compressed into a BS event indicating the start of a front porch 971, a HSS event indicating the start of the HS pulse 972, and a HSE event indicating the end of the HS pulse 972.

Vertical blanking period (HBLK) 980 begins when DE goes low. The VBLK period 980 ends when DE goes high. The VBLK period 980 includes different states: a front porch 981, a HS pulse 982 that signifies a new line within a frame, and a back porch 983. Each of these states may be multiple clock cycles in length. The VBLK period can be compressed into a BS event indicating the start of front porch 981, a VSS event indicating the start of the VS pulse 982, and a VSE event indicating the end of the VS pulse 982.

Figure 9D:
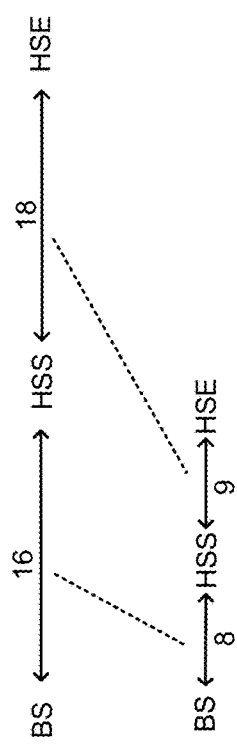
FIG. 9D illustrates compression of timing between blanking events, according to an embodiment.

FIG. 9D illustrates compression of timing between blanking events, according to an embodiment. Initially, after the event generation shown in FIG. 9, the timing of the blanking events matches the timing of blanking state changes. As shown in FIG. 9D, the BS event is separated from the HSS event by 16 clock cycles, and HSS is separated from HSE by 18 clock cycles. The separation between events is then reduced according to a pre-determined 2:1 compression ratio. As a result, BS event is only separated from HSS event by 8 clock cycles and HSS event is separated from HSE event by 9 clock cycles. This halves the total time needed to transmit data for a blanking period from 34 clock cycles to 17 clock cycles. In other embodiments the pre-determined compression ratio may be a different ratio, such as 3:1 or 4:1.

In one embodiment, the blanking compression circuit 408 compresses the blanking period data using a matching table 900, as shown in FIG. 9A. In the table 900 a list of blanking events are shown on the left hand side. Once a blanking event is identified from the blanking period data 425, the blanking event can be encoded into an event code that is transmitted as the compressed blanking period data 427.

The blanking events can be transferred in less time the actual blanking period data used to generate the blanking events. In a conventional system, during a blanking period 970 or 980, the source device must repeatedly transmit symbols for blanking period data throughout the blanking period, which can consume a significant amount of bandwidth. Accordingly, by replacing the actual blanking period data with the blanking events and reducing the amount of time between the blanking events, the blanking periods are compressed. This results in a good compression ratio (e.g., same as video portion or more) and still provides the exact timing for the blanking period.

On the receiving side, the receiver 450 can regenerate the blanking period data based on the provided timing of the blanking events. Specifically, the receiver 450 identifies the blanking events, expands the time between blanking events according to a pre-determined compression ratio (1:2, 1:3) to recover the timing between blanking events, and then regenerates the blanking period data.

Figure 9B:
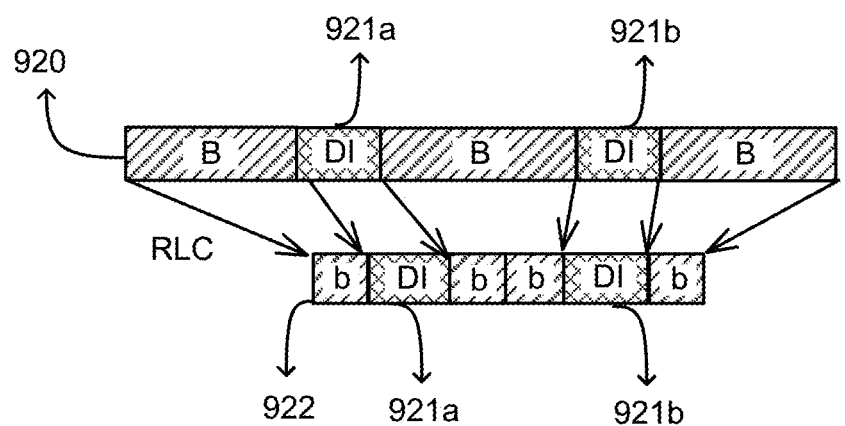

The second way of compressing the blanking period is to apply run length coding on the blanking period data while preserving the position of the data islands. Referring now to FIG. 9B, the illustrated embodiment applies Run Length Coding (RLC) on the blanking period 920 while preserving the positions of the data islands (DIs) 921a, 921b, respectively, in the compressed blanking period 922. The blanking period 920 includes blanking portions during which no data is transferred (indicated by uppercase B), and data island portions during which data islands are being transferred (indicated with cross hatch shading and letter DI). The blanking portions B and data island portions P are intermixed with each other.

The blanking compression circuit 408, as illustrated in FIG. 4A, may compress the blanking period 920 by applying RLC on the blanking period 920 to generate the compressed blanking period 922. Specifically, the blanking compression circuit 408 divides the blanking period data into different portions that are separated by the DIs. The blanking portions are separately compressed with RLC and the data island portions are not compressed. The compressed blanking portions (indicated by lowercase b) are eventually intermixed with the data island portions 921a and 921b to form compressed blanking period 922.

RLC is a form of data compression in which sequences of the same data value are stored as a single data value and a number count indicating the number of times that the data value repeats. When applied to blanking period data, RLC produces timing information specifying states within the blanking period data and the duration of the states. For example, a blanking period typically includes a front porch period before a SYNC pulse, a SYNC pulse, and then a back porch that follows the SYNC pulse. The states within a blanking period can thus be compressed into three states and three numbers: a front porch timing specifying the duration of the front porch (e.g. 4 cycles), a SYNC timing specifying the length of the SYNC pulse (e.g. 3 cycles), and an end porch timing specifying the duration of the end porch (e.g. 5 cycles). In practice, the RLC information transmitted between adjacent DIs 921a and 921b typically specifies one or two states (e.g., front porch, SYNC pulse, or back porch) and the duration of those states.

By preserving the position of the DIs, this embodiment also preserves preambles, which are special indicators used in HDMI and MHL to indicate whether information following the preamble is a DI 921a, 921b or a blanking portion with no DI. This allows the sink device 115 to seamlessly convert the received information back to the original blanking data 920 of an active video stream.

On the receiving end, the blanking decompression circuit 464 will receive compressed blanking period data 465 that includes different compressed blanking portions separated by data islands. The blanking decompression circuit 464 decompresses the compressed blanking portions into the blanking period data 469 using run length decoding to recover the proper timing for a blanking period.

Figure 9C:
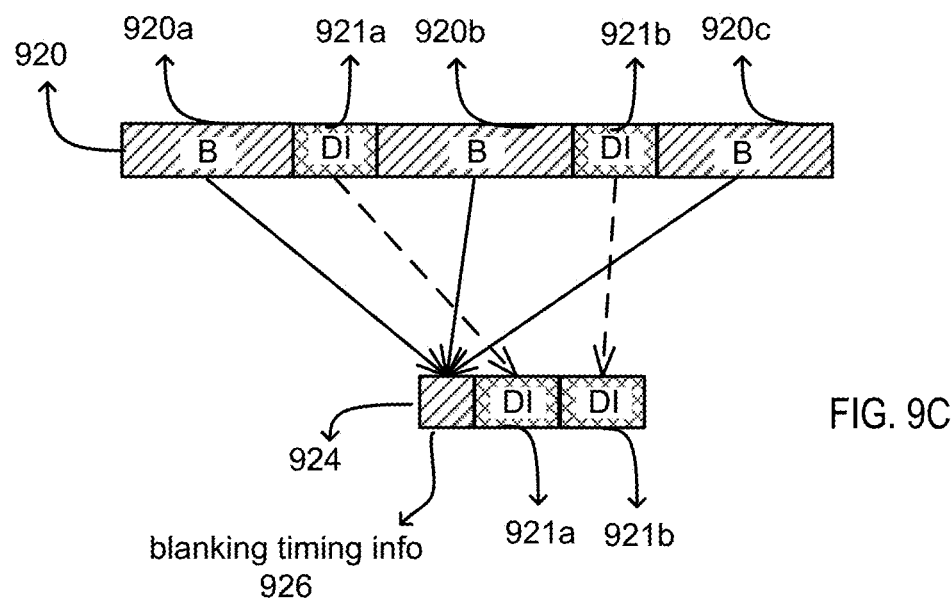

The third way of compressing the blanking period is to represent the blanking period using blanking timing information and to send all DIs together. Referring to FIG. 9C, in the illustrated embodiment, the blanking period 920 is compressed into a compressed blanking period 924. The states of the blanking period 920 are represented as a single set of blanking timing information 926 and several DIs 921a, 921b are sent together. The blanking compression circuit 408, as illustrated in FIG. 4A, may compress the blanking period 920 (that includes different portions 920a, 920b, 920c) by counting the duration of the blanking states and then generating the blanking timing information 926 from the duration of the blanking states. The blanking timing information 926 describes the duration of different states of the blanking period 920a, 920b, 920c. For example, the blanking timing information 926 can specify a 4 cycle front porch, 5 cycle HS pulse, and a 6 cycle back porch.

The states of the entire blanking period 920 are thus represented with a single chunk of blanking timing information 926 that is sent at the beginning of the compressed blanking period 924. All of the DIs 921a, 921b are combined and sent together at the end of the compressed blanking period 924.

On the receiving side, the blanking decompression circuit 464 will receive compressed blanking period data 465 that includes a single set of blanking timing information 926 for each blanking period. The blanking decompression circuit 464 decompresses the blanking timing information 926 into the blanking period data 469 to recover the proper timing for a blanking period.

This embodiment enables a better compression ratio for the compression of the blanking period 920 than the embodiment illustrated in FIG. 9B. However, although not shown in FIG. 9C, the blanking portions B may also include preambles that precede the DIs and follow the DIs. These preambles are lost and must be recovered at the receiver. Therefore this embodiment may use a timing generator on the receiver side (e.g., the receiver 450) to recover the preambles. The timing generator recovers the pre-amble by assuming that DIs each has a fixed size. The timing generator divides the combined data island into separate fixed size DIs 921a and 921b, and then inserts preambles before and after the DIs 921a and 921b.

Figure 10:
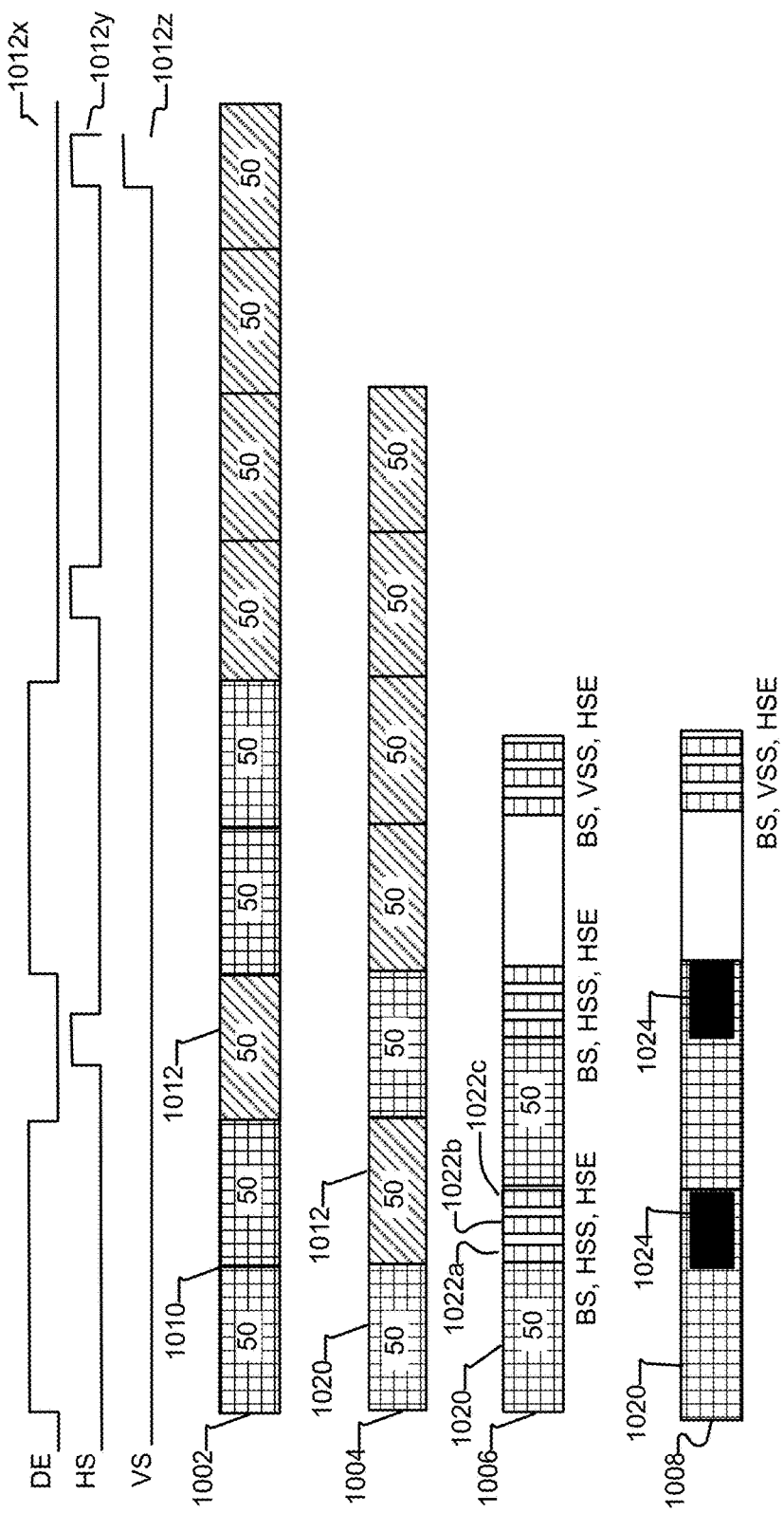
FIG. 10 is a diagram illustrating the benefit of blanking period compression, according to one embodiment.

FIG. 10 is a diagram illustrating the benefit of video and blanking period compression, according to one embodiment. In the illustrated embodiment, row 1002 represents uncompressed active video data 1010 with uncompressed blanking periods 1012. The blanking periods 1012 and their states may be indicated by different signal components, such as DE 1012x, HS 1012y, and VS 1012z. Row 1004 represents the 2:1 compression of video data, without blanking period compression. For example, the active video data 1010 is compressed at 2:1 compression ratio to obtain compressed video data 1020. That is, 100 Kbits of video data is compressed to 50 Kbits of video data. However, the blanking period 1012 is not yet compressed.

Row 1006 represents the compressed video data 1020 with blanking period compression using blanking events (e.g., BS 1022a, HSS 1022b, HSE 1022c). That is, blanking period data within blanking period 1012 is replaced with blanking events BS 1022a, HSS 1022b and HSE 1022c. The timing of the blanking events is also compressed such that the blanking events can be transmitted in a smaller number of clock cycles (e.g., 25 cycles).

Further, the transmitter 400 can reduce the blanking periods and use the blanking periods for active video instead. There are two ways to achieve this: reducing the HBLK period and using the saved bandwidth (BW) for transmission of active video data, or reducing the VBLK period and using the saved BW for transmission of active video data. Row 1008 represents the compressed video data 1020 with blanking period compression having no HBLK period or horizontal SYNC (HSYNC) at all. The block 1024 represents the portion of the BW currently used for transmission of compressed active video data 1020 and previously used to transmit blanking periods. As shown, by removing the first two horizontal blanking periods and transmitting active video data in place of the blanking periods, there is now additional BW for transferring compressed video data.

This approach in row 1008 is typically appropriate when the blanking periods do not include any DIs. This approach may use a timing generator on the receiver 450 side to recover correct timing of the blanking states. The timing generator is provided with resolution information describing the resolution of the active video data. As each resolution is typically associated with a line size, number of pixels in each line, and synchronization timing, the resolution can be used to recover the proper timing of the blanking states.

Figure 11:
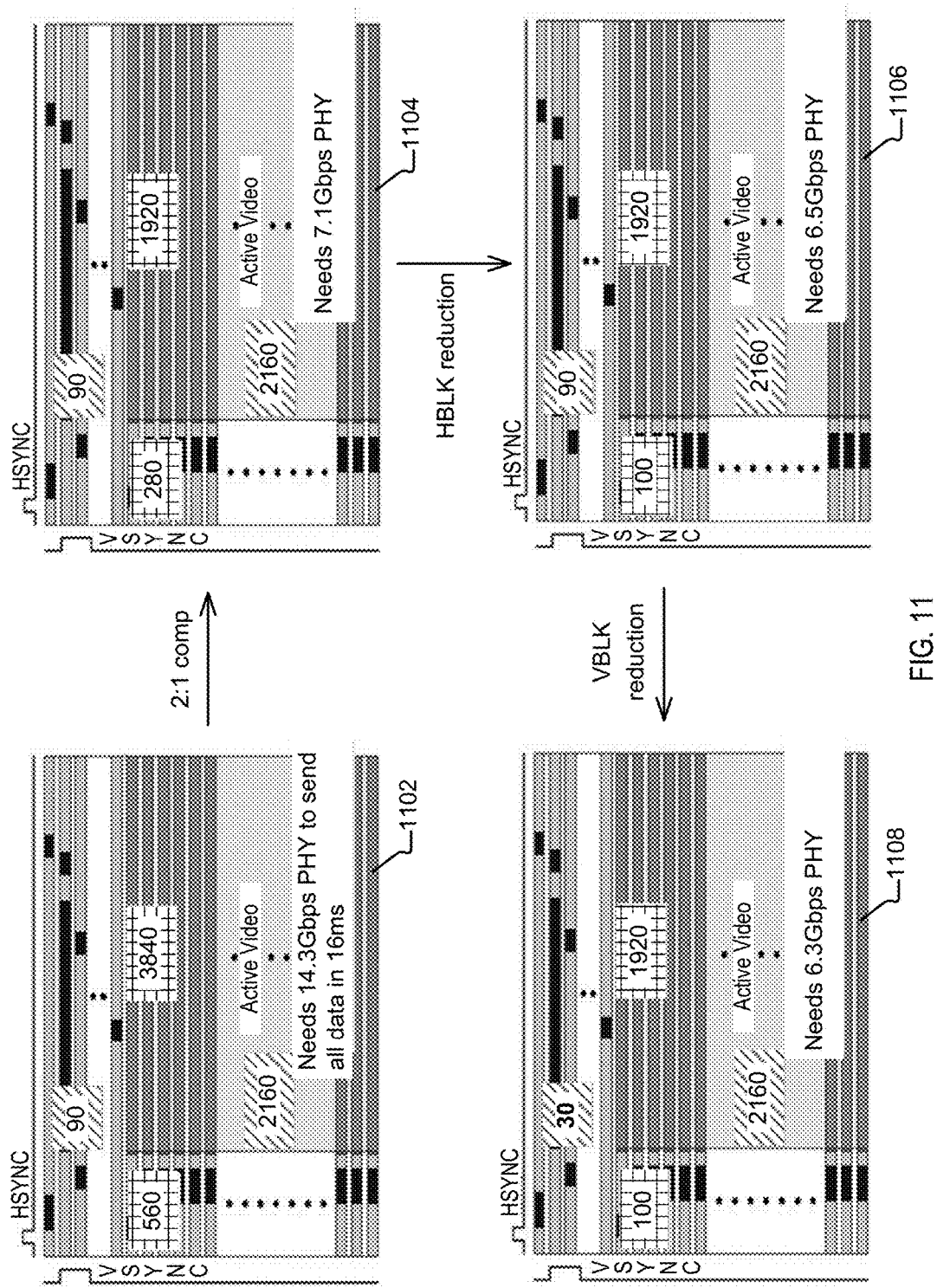
FIG. 11 is a diagram illustrating the impact of blanking period compression to the required band width for a 4K video solution, according to one embodiment.

FIG. 11 is a diagram illustrating the impact of blanking period compression on required bandwidth for a 4K video, according to one embodiment. In the illustrated embodiment, the original scheme 1102 includes uncompressed active video data and uncompressed blanking periods. In the original scheme 1102, a 14.3 Gbps PHY is required to send all data in 16 ms. The second scheme 1104 has video data compressed at a 2:1 rate without blanking period compression. It needs a 7.1 Gbps PHY to send the data. The third scheme 1106 compresses the blanking periods by reducing the horizontal blanking HBLK periods and needs 6.5 Gbps PHY to send all the data. The fourth scheme 1108 further compresses the blanking periods by also reducing the vertical blanking VBLK periods and needs 6.3 Gbps PHY to send the data.

Also, HBLK and VBLK are required to be large enough to allow for transfer of DIs. The compression ratio of blanking periods having DI packets cannot be guaranteed, since DI is not compressed at all. To solve this problem, the DIs in each line are limited to the amount that can be accommodated in the compressed AV stream, i.e., blanking period in the target stream format that will carry compressed data. For example, if a 4K video is compressed by a 4:1 ratio to make it fit into a 1080p stream, the amount of DIs is limited to a value that can be put into a 1080p stream. Alternatively, after compressing the active video part, the compressed video is put in the active video period of the target HDMI stream, while the audio part is put without any compression into the blanking period of the target HDMI stream (1080p in this example). This guarantees the proper amount of audio data in the compressed HDMI stream because audio is put directly into the target (compressed) HDMI stream instead of being put into the original HDMI stream that goes through a compression.

Figure 12:
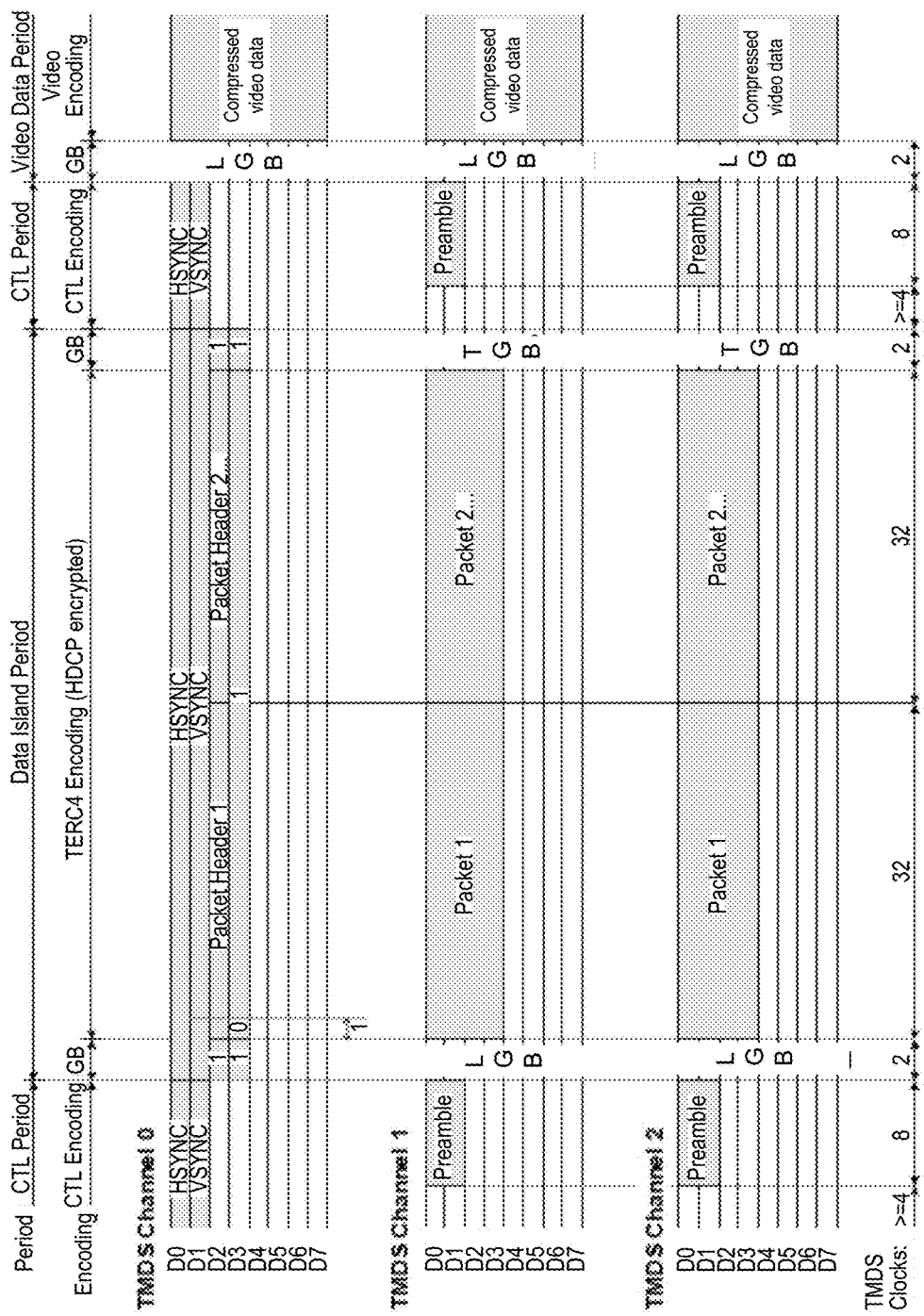
FIG. 12 is a diagram illustrating the HDMI stream with compressed data, according to one embodiment.

Next, the link specific portion of the compression will be described with reference to FIG. 12, i.e., how to put the compressed video stream and how to inform the receiver of the compression vs. non-compression.

Link Specific-HDMI1, HDMI2, MHL1, MHL2

The transmitter side of a HDMI system will put the compressed video data in place of the active video period of the HDMI stream. FIG. 12 is a diagram illustrating the HDMI stream with compressed data, according to one embodiment. In the illustrated embodiment, the "Video Encoding" part contains the compressed video data. The transmitter 400 may inform the receiver 450 that the data is the compressed video data. In addition, the transmitter 400 may also transmit video compression control information 411 to the receiver 450 to notify the receiver 450 about which compression algorithm (e.g., using an algorithm ID) was used in the transmitter 400 and any possible parameters used in the specific algorithm to support various compression mechanisms. This can be implemented in a couple of ways.

First, a side channel can be used, such as DDC in HDMI and CBUS in MHL, to transfer the compression control information 411. The transmitter 400 writes specific values to registers in the receiver 450 over the DDC or CBUS and the receiver 450 can determine that the input stream is a compressed stream by interpreting the values in the registers. After this informing process, the transmitter 400 sends compressed video data to the receiver 450 and the receiver 450 can interpret the incoming stream of the compressed video data as a compressed stream correctly.

Second, a "Preamble" and/or "Leading Guard Band (LGB)" can be used to transfer the video compression control information 411. As shown in FIG. 12, the preambles and/or the LGBs precede a video data period for the compressed video data. By putting a specific value in either or in both of them, the transmitter 400 can notify the receiver 450 that the incoming stream is a compressed stream. Referring back to FIG. 4A, the video compression control information 411 may be transmitted as a preamble or a leading guard band (LGB) preceding a video transmission period for the compression video data 403, via the transmitting interface circuit 412 and a multimedia communication link (not pictured) between the transmitter 400 and a receiver 450. The TMDS encoding circuit 406 may be responsible for generating the preamble or leading guard band (LGB) from the video compression control information 411.

Third, an information frame can be used to transfer the video compression control information 411. For example, the information frame may be a data island (that conveys audio and other information during blanking period) in the blanking period. The information frame is not compressed, thus information in the information frame can be correctly decoded in the receiver side regardless of compression of active video data. Referring back to FIG. 4A-4B, the transmitter 400 transmits the video compression control information 411 in an information frame during a blanking period to the receiver 450. Accordingly, the receiver 450 can determine if incoming video is compressed or not based on the information frame.

If the receiver 450 determines that the incoming stream is a compressed stream, the receiver 450 forwards the compressed video data to the video decompression circuit 460 to extract the original video data. After extraction, the HDMI stream becomes the same as the normal non-compressed HDMI stream and all the normal processes of the receiver side will follow.

For the blanking period, as mentioned before, the transmitter 400 puts the DIs into the compressed target HDMI stream so as not to put too many DIs in the blanking period. If RLC (run length coding) and/or blanking events were used to compress the blanking period, the transmitter 400 informs the receiver 450 of this by using a different "preamble" and/or combination of blanking period characters. The different preamble and/or blanking period characters can be used to notify the receiver 450 if the following data is a normal blanking period or a compressed blanking period.

The transmitter 400 may also notify the receiver of the target resolution (i.e., resolution after decompression), especially if any blanking reduction is used. Using the target resolution, the receiver 450 can regenerate correct blanking period timing. This information can reach the receiver 450 either through DIs and/or side band registers (similar to the scheme used for compression notification).

In one embodiment, the receiver 450 regenerates the normal (non-compressed) HDMI/MHL stream. For example, the receiver 450 can do the following steps as well as decompressing the video data. First, the receiver 450 regenerates all the blanking timing if blanking reduction was used in the transmitter side, i.e., a reduced blanking period to a normal blanking period. Second, the receiver 450 extracts DIs, such as those carrying audio content or auxiliary information, from the incoming (compressed) stream and sends them out per target (e.g., 4K) HDMI/MHL stream along with decompressed video data. Therefore, the content of DIs (e.g., audio data) is preserved.

Third, for some other DIs (e.g., AVI, AIF), the receiver 450 drops them from the input stream and totally regenerates them per target stream. This is because the contents of such DIs are stream specific and DIs in the compressed stream cannot be reused for the target stream output due to different resolutions.

Fourth, a latency aligner may align the latency between video path going through the video decompression circuit 460 and audio DIs. Other DIs that are timing critical per target stream (e.g., GCP, VSI, etc.) are totally regenerated per target stream's timing.

Link Specific—MHL3

MHL3 is a packet based stream and one of its packets (i.e., AV stream packet) can carry HDMI and MHL stream as is using tunneling technology. In addition, it supports side channel tunneling that tunnels a side channel of HDMI and MHL. Therefore, all the techniques mentioned above for HDMI and MHL can be used without change in MHL3. In addition to that, MHL3's packet based scheme provides some additional options for transmitting compression information. For example, the compression information about whether the incoming data is a compressed one or not can be placed in a header of a packet. FIG. 13 is a chart illustrating the packet header bytes of a stream packet, according to one embodiment. If a packet includes uncompressed video data, the pkt_type field can bet set to 0b0001 to indicate that the packet includes uncompressed video data. If a packet includes compressed video data, the pkt_type field can bet set to 0b0111 to indicate that the packet includes compressed video data.

The compression algorithm ID indicating a specific compression algorithm used for the incoming stream and corresponding compression parameters can be inserted into a couple of places. First, they can be put into a MHL Vendor Specific Info Frame (VSIF) that comes in the AV stream packet. Second, a separate packet can be used instead of an AV stream packet. For example, the separate packet may be the content protection (CP) packet of MHL that comes at every frame. This approach does not affect the AV stream packet side at all and can also minimize the sync issue.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to, with, or together with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

Upon reading this disclosure, those of skill in the art will appreciate still additional alternative designs for compressed video content transfer over HDMI and MHL. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and device of the present disclosure disclosed herein without departing from the spirit and scope of the disclosure as defined in the appended claims.

What is claimed is:

1. A transmitting device for communicating via a multimedia communication link, the transmitting device comprising:
    a circuit to receive data island data that includes at least one of auxiliary data or audio data;
    a compression circuit to receive blanking period data describing video blanking states, the compression circuit to compress the blanking period data into compressed blanking period data but not to compress the data island data; and
    an interface circuit to transmit the data island data and the compressed blanking period data via the multimedia communication link during one or more video blanking periods.

2. The transmitting device of claim 1, wherein the circuit is an encryption circuit configured to encrypt the data island data without encrypting the compressed blanking period data, and the data island data transmitted by the interface circuit is in encrypted form while the compressed blanking period data transmitted by the interface circuit is in unencrypted form.

3. The transmitting device of claim 1, wherein the interface circuit is configured to transmit data via the multimedia communication link indicating that the one or more video blanking periods are compressed blanking periods instead of uncompressed blanking periods.

4. The transmitting device of claim 1, wherein the compression circuit is configured to generate blanking compression information describing compression of the compressed blanking period data, and the interface circuit is configured to transmit the blanking compression information via the multimedia communication link.

5. The transmitting device of claim 1, wherein the compressed blanking period data includes blanking events indicative of state changes of the video blanking states.

6. The transmitting device of claim 1, wherein the compression circuit is configured to compress the blanking period data by applying run length coding on the blanking period data to generate the compressed blanking period data.

7. The transmitting device of claim 1, wherein, for at least one video blanking period, the compression circuit is configured to compress the blanking period data for the video blanking period by dividing the blanking period data into different portions that are separated by data islands and separately compressing each of the different portions.

8. The transmitting device of claim 1, wherein, for at least one video blanking period, that includes data islands, the compression circuit is configured to compress the blanking period data for the video blanking period by compressing the blanking period data into a single set of blanking timing information describing duration of the video blanking states of the blanking period data.

9. The transmitting device of claim 1, wherein the transmitting device is configured to replace additional video blanking periods with compressed video data, the interface circuit configured to transmit the compressed video data via the multimedia communication link.

10. A receiving device for communicating via a multimedia communication link, the receiving device comprising:
    an interface circuit to receive data island data and compressed blanking period data via a multimedia communication link during one or more video blanking periods, the data island data including at least one of auxiliary data or audio data; and
    a decompression circuit to decompress the compressed blanking period data but not-decompress the data island data, the compressed blanking period data decompressed into blanking period data describing video blanking states.

11. The receiving device of claim 10, wherein the data island data received by the interface circuit is in encrypted form while the compressed blanking period data received by the interface circuit is in unencrypted form, and the receiving device further comprises:
    a decryption circuit to decrypt the data island data without decrypting the compressed blanking period data.

12. The receiving device of claim 10, wherein the interface circuit is configured to receive a notification via the multimedia communication link indicating that the one or more video blanking periods are compressed blanking periods instead of uncompressed blanking periods.

13. The receiving device of claim 10, wherein the interface circuit is configured to receive, via the multimedia communication link, blanking compression information describing compression of the compressed blanking period data, and wherein the decompression circuit is configured to decompress the compressed blanking period data based on the blanking compression information.

14. The receiving device of claim 10, wherein the compressed blanking period data includes blanking events indicative of state changes of the video blanking states.

15. The receiving device of claim 10, wherein the compressed blanking period data is decompressed by applying run length decoding on the compressed blanking period data to generate the blanking period data.

16. The receiving device of claim 10, wherein, for at least one video blanking period, the compressed blanking period data for the video blanking period includes different portions that are separated by data islands, and the decompression circuit is configured to decompress the portions into the blanking period data.

17. The receiving device of claim 10, wherein, for at least one video blanking period that includes data islands, the compressed blanking period data for the video blanking period includes a single set of blanking timing information corresponding to the blanking states of the blanking period data, and the decompression circuit is configured to decompress the single set of blanking timing information into the blanking period data.

18. A method for communicating via a multimedia communication link, the method comprising:
    receiving data island data that includes at least one of auxiliary data or audio data;
    receiving blanking period data describing video blanking states;
    compressing the blanking period data into compressed blanking period data but not compressing the data island data; and
    transmitting the data island data and the compressed blanking period data via the multimedia communication link during one or more video blanking periods.

19. The method of claim 18, further comprising:
    encrypting the data island data without encrypting the compressed blanking period data,
    wherein the data island data is transmitted in encrypted form while the compressed blanking period data is transmitted in unencrypted form.

20. A method for communicating via a multimedia communication link, the method comprising:
    receiving data island data and compressed blanking period data via a multimedia communication link during one or more video blanking periods, the data island data including at least one of auxiliary or audio data; and
    decompressing the compressed blanking period data into blanking period data but not decompressing the data island data, the compressed blanking period data decompressed into blanking period data describing video blanking states.

* * * * *

UNITED STATES PATENT AND TRADEMARK OFFICE
CERTIFICATE OF CORRECTION

PATENT NO. : 10,027,971 B2
APPLICATION NO. : 15/730684
DATED : July 17, 2018
INVENTOR(S) : Hoon Choi and Ju Hwan Yi It is certified that error appears in the above-identified patent and that said Letters Patent is hereby corrected as shown below:

In the Claims

Column 20, Line 57, Claim 10: delete "not-decompress" and insert --not decompress--

Signed and Sealed this
Twenty-sixth Day of March, 2019

Andrei Iancu
*Director of the United States Patent and Trademark Office*